(12) United States Patent
Tang

(10) Patent No.: US 8,024,121 B2
(45) Date of Patent: Sep. 20, 2011

(54) DATA COMPRESSION METHOD FOR USE IN DOWNHOLE APPLICATIONS

(75) Inventor: Caimu Tang, Sugar Land, TX (US)

(73) Assignee: Smith International, Inc., Houston, TX (US)

(*) Notice: Subject to any disclaimer, the term of this patent is extended or adjusted under 35 U.S.C. 154(b) by 793 days.

(21) Appl. No.: 12/011,422

(22) Filed: Jan. 25, 2008

(65) Prior Publication Data

US 2009/0192711 A1 Jul. 30, 2009

(51) Int. Cl.
*G01V 1/30* (2006.01)
(52) U.S. Cl. .......................................................... 702/6
(58) Field of Classification Search .................. 702/6, 7, 702/9, 11, 150, 151, 189, 196; 382/115, 382/232, 246, 248, 281, 253, 276
See application file for complete search history.

(56) References Cited

U.S. PATENT DOCUMENTS

| | | | |
|---|---|---|---|
| 5,594,706 A | 1/1997 | Shenoy et al. | |
| 6,405,136 B1 | 6/2002 | Li et al. | |
| 6,567,081 B1* | 5/2003 | Li et al. | 345/419 |
| 7,068,182 B2 | 6/2006 | Golla et al. | |
| 7,107,153 B2 | 9/2006 | Kisra et al. | |
| 7,200,492 B2 | 4/2007 | Hassan et al. | |
| 7,272,504 B2 | 9/2007 | Akimov et al. | |
| 7,283,910 B2 | 10/2007 | Hassan et al. | |
| 2002/0021754 A1 | 2/2002 | Pian et al. | |
| 2003/0128877 A1 | 7/2003 | Nicponski | |
| 2004/0222019 A1* | 11/2004 | Estes et al. | 175/45 |
| 2004/0258301 A1 | 12/2004 | Payton | |
| 2007/0027629 A1 | 2/2007 | Hassan et al. | |
| 2007/0112521 A1* | 5/2007 | Akimov et al. | 702/6 |
| 2007/0223822 A1 | 9/2007 | Haugland | |

OTHER PUBLICATIONS

Durbin, J., "The Fitting of Time-Series Models," Review of International Statistical Institute, vol. 28, No. 3. (1960). pp. 233-244.
Makhoul, John, "Linear Prediction: A Tutorial Review," Proceedings of the IEEE, vol. 63, No. 4, Apr. 1975, pp. 561-580.
Lloyd, Stuart P., "Least Squares Quantization in PCM," IEEE Transactions on Information Theory, vol. IT28, No. 2, Mar. 1982, pp. 129-137.
Golub, G. H. and Van Loan, C. F., "Matrix Computations," 3rd Ed., The Johns Hopkins University Press, Baltimore, MD, 1996, pp. 391-469.
Huang, J. Y. and Schultheiss, P., "Block quantization of correlated Gaussian random variables," IEEE Trans. Communications System, COM-11(9): pp. 289-296, Sep. 1963.
Goyal, V. K., "Theoretical foundations of transform coding," IEEE Signal Processing Magazine, vol. 18 No. 9, Sep. 21, 2001.
Zeng, Y., Cheng, L., Bi, G., and Kot, A. C. "Integer DCTs and fast algorithms," IEEE Trans. on Signal Processing, 49(11): pp. 2774-2782, Nov. 2001.

(Continued)

*Primary Examiner* — Mohamed Charioui

(57) ABSTRACT

Borehole image data is compressed and transmitted to the surface one pixilated trace at a time. The compression methodology typically includes transform, quantization, and entropy encoding steps. The invention advantageously provides for sufficient data compression to enable conventional telemetry techniques (e.g., mud pulse telemetry) to be utilized for transmitting borehole images to the surface. By compressing and transmitting sensor data trace by trace the invention also tends to significantly reduce latency.

21 Claims, 4 Drawing Sheets

OTHER PUBLICATIONS

Plonka, G., and Tasche., M. "Invertible integer DCT algorithms," Applied and Computational Harmonic Analysis, 15(1); pp. 70-88, Jul. 2003.

Malvar, H. S., Hallapuro, A., Karczewicz, M., and Kerofsky, L., "Low-complexity transform and quantization in H.264/AVC," IEEE Trans. Circuits Systems for Video Technology, 13(7), pp. 598-603, Jul. 2003.

He., Z., and Mitra, S., "A Unified Rate-Distortion Analysis Framework for Transform Coding," IEEE Trans. on Circuits and Systems for Video Technology, 11(2), pp. 1221-1236, Dec. 2001.

Joshi, R. L., and Fischer, T. R., "Comparison of generalized Gaussian and Laplacian modeling in DCT image coding," IEEE Signal Processing Letters, 2(5); pp. 81-82, May 1995.

* cited by examiner

DATA COMPRESSION METHOD FOR USE IN DOWNHOLE APPLICATIONS

RELATED APPLICATIONS

None.

FIELD OF THE INVENTION

The present invention relates generally to data communication between a downhole tool deployed in a subterranean borehole and surface instrumentation. More particularly, this invention relates to downhole techniques for compressing logging while drilling image data prior to transmission to the surface.

BACKGROUND OF THE INVENTION

Logging techniques for determining numerous borehole and formation characteristics are well known in oil drilling and production applications. Such logging techniques include, for example, natural gamma ray, spectral density, neutron density, inductive and galvanic resistivity, acoustic velocity, acoustic caliper, downhole pressure, and the like. In conventional wireline logging applications, a probe having various sensors is lowered into a borehole after the drill string and bottom hole assembly (BHA) have been removed. Various parameters of the borehole and formation are measured and correlated with the longitudinal position of the probe as it is pulled uphole. More recently, the development of logging while drilling (LWD) applications has enabled the measurement of such borehole and formation parameters to be conducted during the drilling process. The measurement of borehole and formation properties during drilling has been shown to improve the timeliness and quality of the measurement data and to often increase the efficiency of drilling operations.

LWD tools are often used to measure physical properties of the formations through which a borehole traverses. Formations having recoverable hydrocarbons typically include certain well-known physical properties, for example, resistivity, porosity (density), and acoustic velocity values in a certain range. Such LWD measurements may be used, for example, in making steering decisions for subsequent drilling of the borehole. For example, an essentially horizontal section of a borehole may be routed through a thin oil bearing layer (sometimes referred to in the art as a payzone). Due to the dips and faults that may occur in the various layers that make up the strata, the drill bit may sporadically exit the oil-bearing layer and enter nonproductive zones during drilling. In attempting to steer the drill bit back into the oil-bearing layer (or to prevent the drill bit from exiting the oil-bearing layer), an operator typically needs to know in which direction to turn the drill bit (e.g., up, down, left, or right). In order to make correct steering decisions, information about the strata, such as the dip and strike angles of the boundaries of the oil-bearing layer is generally required. Such information may possibly be obtained from azimuthally sensitive measurements of the formation properties and, in particular, from images derived from such azimuthally sensitive measurements.

Downhole imaging tools are conventional in wireline applications. Such wireline tools typically create images by sending large quantities of azimuthally sensitive logging data uphole via a high-speed data link (e.g., a cable). Further, such wireline tools are typically stabilized and centralized in the borehole and include multiple (often times one hundred or more) sensors (e.g., resistivity electrodes) extending outward from the tool into contact (or near contact) with the borehole wall. It will be appreciated by those of ordinary skill in the art that such wireline arrangements are not suitable for typical LWD applications. For example, communication bandwidth with the surface is typically insufficient during LWD operations to carry large amounts of image-related data (e.g., via known mud pulse telemetry or other conventional techniques).

Several LWD imaging tools and methods have been disclosed in the prior art. Most make use of the rotation (turning) of the BHA (and therefore the LWD sensors) during drilling of the borehole. For example, U.S. Pat. No. 5,473,158 to Holenka et al. discloses a method in which sensor data (e.g., neutron count rate) is grouped by quadrant about the circumference of the borehole. Likewise, U.S. Pat. No. 6,307,199 to Edwards et al., U.S. Pat. No. 6,584,837 to Kurkoski, and U.S. Pat. No. 6,619,395 to Spros disclose similar binning methods. In an alternative approach, U.S. Pat. No. 7,027,926 to Haugland, which is commonly assigned with the present invention, discloses a method in which azimuthally sensitive sensor data are convolved with a predetermined window function. Such an approach tends to advantageously reduce image noise as compared to the above described binning techniques.

LWD data are conventionally transmitted uphole (to the surface) via mud pulse telemetry techniques. Such techniques are typically limited to data transmission rates (bandwidth) on the order of only a few bits per second. Since LWD imaging sensors typically generate data at much higher rates than is possible to transmit to the surface, borehole images are often processed from data stored in memory only after the tools have been removed from the wellbore. Significant data compression is required to transmit images to the surface during drilling. While the above described binning and windowing techniques do provide for significant data reduction, significant further data compression is necessary in order to transmit images to the surface in a timely fashion (e.g., such that the borehole images may be utilized in steering decisions). Mud pulse telemetry techniques also tend to be error prone. Thus, a suitable LWD image compression scheme requires a high degree of error resilience. Furthermore, payzone steering (with LWD) is highly sensitive to latency as a delayed response allows the drill bit to potentially continue drilling in the wrong direction. Hence, low latency compression and transmission is highly desirable.

Transform coding techniques are known in the art. For example, U.S. Pat. No. 6,405,136 to Li et al. discloses a method for compressing borehole image data, which includes generating a two-dimensional Fourier Transform of a frame of data, transmitting a quantized representation of some of the Fourier coefficients to the surface, and applying a forward Fourier Transform to the coefficients to recover an approximate image at the surface. The use of discrete cosine transforms (DCT) and wavelet transforms are also known in the art. One drawback with the Li et al approach is that relatively large, two-dimensional data frames are required in order to get sufficient compression, which thereby increases data latency (the time delay between when the data is generated downhole and received at the surface).

Therefore there exists a need for an improved data compression method, and in particular a data compression method suitable for sufficiently compressing LWD image data so that the compressed data may be transmitted to the surface via conventional telemetry techniques.

SUMMARY OF THE INVENTION

The present invention addresses one or more of the above-described drawbacks of prior art data compression and communication techniques. Aspects of this invention include a method for logging a subterranean borehole during drilling in which a single, pixilated trace of sensor data is compressed and transmitted to the surface. Exemplary embodiments of the invention re-organize the pixilated trace of sensor data from a one-dimensional matrix to a two-dimensional matrix of pixels prior to compression. Further exemplary embodiments may compute a difference between sequential traces to a obtain residuals prior to compression. The compression methodology typically includes transform, quantization, and entropy encoding steps. In one exemplary embodiment, a non-orthogonal, KLT-like transform may be utilized. Further exemplary embodiments may increment or interpolate a quantization parameter to obtain a number of bits during compression substantially equal to a predetermined target number of bits per pixilated trace.

Exemplary embodiments of the present invention may advantageously provide several technical advantages. For example, exemplary methods according to this invention typically provide for sufficient data compression to enable conventional telemetry techniques (e.g., mud pulse telemetry) to be utilized for transmitting borehole images to the surface. Moreover, the present invention advantageously compresses and transmits sensor data trace by trace (i.e., one trace at a time), which tends to significantly reduce latency. Exemplary embodiments in accordance with the invention also tend to significantly reduce computational requirements during compression (as compared to prior art methods) and therefore may be advantageously utilized in LWD applications in which computational resources tend to be limited.

In one aspect the present invention includes a method for logging a subterranean borehole. The method includes (i) acquiring a one-dimensional, pixilated trace of logging while drilling sensor data, the pixilated trace including a plurality of borehole parameter values at a corresponding plurality of discrete tool face angles; (ii) compressing the pixilated trace to obtain a compressed trace; and (iii) transmitting the compressed trace to the surface.

In another aspect, the invention includes a method for logging a subterranean borehole. The method includes acquiring a pixilated trace of sensor data, the pixilated trace including a one-dimensional matrix having a plurality of borehole parameter values at a corresponding plurality of discrete tool face angles. The method further includes reorganizing the one-dimensional matrix of parameter values to obtain a two-dimensional matrix of parameter values and applying a transform to the two-dimensional matrix of parameter values to acquire a two-dimensional matrix of transform coefficients. The method still further includes quantizing the transform coefficients to obtain quantized coefficients and transmitting the quantized coefficients uphole.

In a further aspect, the invention includes a method for logging a subterranean borehole. The method includes acquiring a pixilated trace of sensor data, the pixilated trace including a plurality of borehole parameter values at a corresponding plurality of discrete tool face angles and applying a non-orthogonal, KLT-like transform to the pixilated trace to obtain transform coefficients. The method further includes quantizing the transform coefficients to obtain quantized coefficients and transmitting the quantized coefficients uphole.

In still another aspect, the invention includes a method for logging a subterranean borehole. The method includes acquiring first and second one-dimensional, pixilated traces of sensor data, each of which includes a plurality of borehole parameter values at a corresponding plurality of discrete tool face angles. The first and second pixilated traces are acquired at corresponding first and second measured depths in the borehole. The method further includes computing a difference between the first and second pixilated traces to obtain residuals, applying a transform to the residuals to obtain coefficients, quantizing the coefficients to obtain quantized coefficients, and transmitting the quantized coefficients uphole.

In yet another aspect, the invention includes a method for logging a subterranean borehole. The method includes acquiring a pixilated trace of sensor data, the pixilated trace including a plurality of borehole parameter values at a corresponding plurality of discrete tool face angles and computing a target number of bits to obtain during compression of the pixilated trace. The method further includes applying a transform to the pixilated trace to obtain coefficients and quantizing the coefficients a plurality of times using a corresponding plurality of quantization parameters to obtain a plurality of sets of quantized coefficients. The method still further includes entropy encoding each of the sets of quantized coefficients to obtain a corresponding bit stream for each of the sets, selecting the set that has a number of bits closest to the target number of bits to obtain a preferred bit stream, and transmitting the preferred bit stream uphole.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
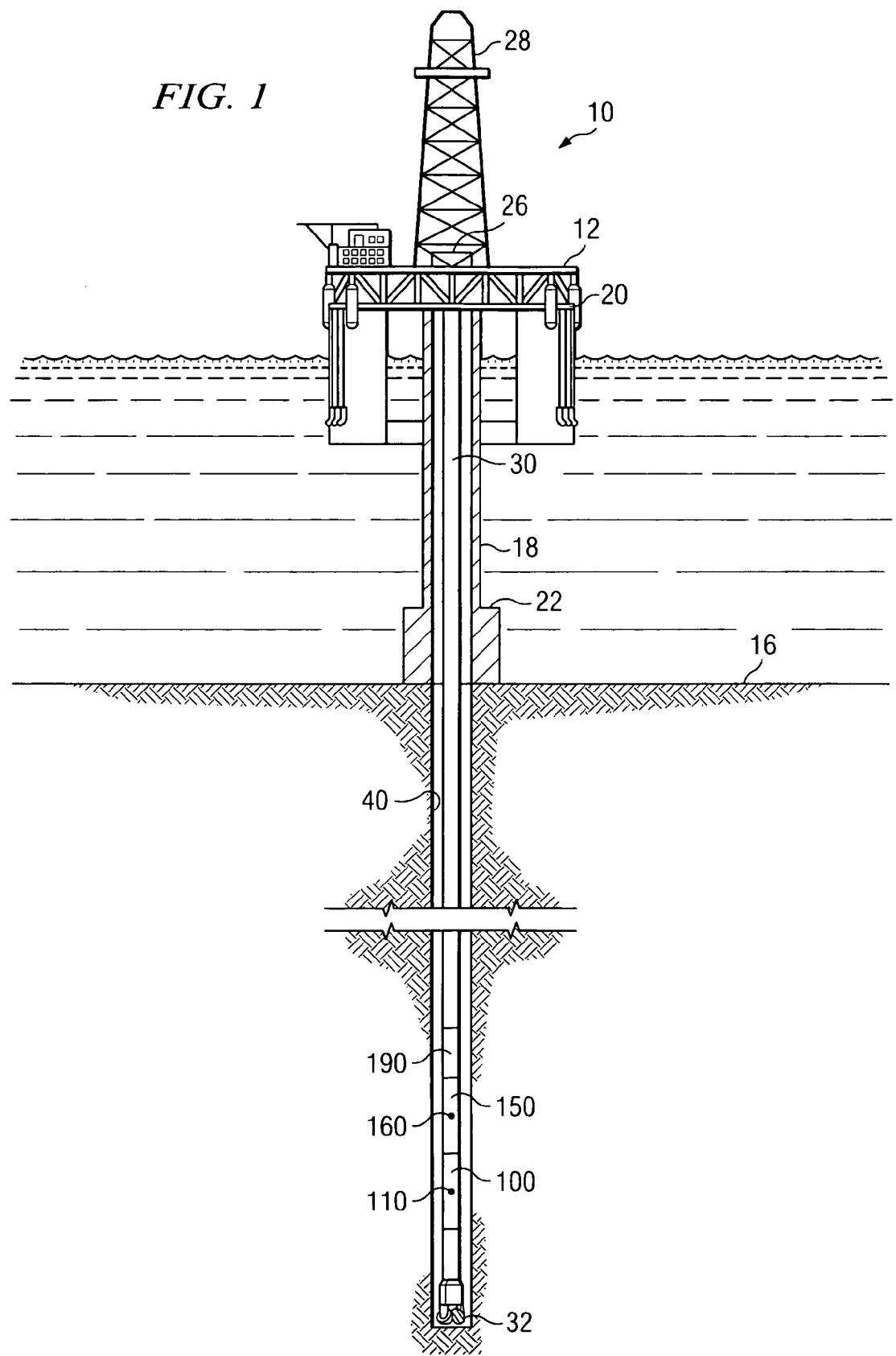
FIG. 1 depicts one exemplary LWD tool deployed in a borehole and suitable for use in accordance with aspects of this invention.

Before proceeding with a discussion of the present invention, it is necessary to make clear what is meant by "azimuth" as used herein. The term azimuth has been used in the downhole drilling art in two contexts, with a somewhat different meaning in each context. In a general sense, an azimuth angle is a horizontal angle from a fixed reference position. Mariners performing celestial navigation used the term, and it is this use that apparently forms the basis for the generally understood meaning of the term azimuth. In celestial navigation, a particular celestial object is selected and then a vertical circle, with the mariner at its center, is constructed such that the circle passes through the celestial object. The angular distance from a reference point (usually magnetic north) to the point at which the vertical circle intersects the horizon is the azimuth. As a matter of practice, the azimuth angle was usually measured in the clockwise direction.

It is this meaning of "azimuth" that is used to define the course of a drilling path. The borehole inclination is also used in this context to define a three-dimensional bearing direction of a point of interest within the borehole. Inclination is the angular separation between a tangent to the borehole at the point of interest and vertical. The azimuth and inclination values are typically used in drilling applications to identify bearing direction at various points along the length of the borehole. A set of discrete inclination and azimuth measurements along the length of the borehole is further commonly utilized to assemble a well survey (e.g., using the minimum curvature assumption). Such a survey describes the three-dimensional location of the borehole in a subterranean formation.

A somewhat different meaning of "azimuth" is found in some borehole imaging art. In this context, the azimuthal reference plane is not necessarily horizontal (indeed, it seldom is). When a borehole image of a particular formation property is desired at a particular depth within the borehole, measurements of the property are taken at points around the circumference of the measurement tool. The azimuthal reference plane in this context is the plane centered at the center of the measurement tool and perpendicular to the longitudinal direction of the borehole at that point. This plane, therefore, is fixed by the particular orientation of the borehole at the time the relevant measurements are taken.

An azimuth in this borehole imaging context is the angular separation in the azimuthal reference plane from a reference point to the measurement point. The azimuth is typically measured in the clockwise direction, and the reference point is frequently the high side of the borehole or measurement tool, relative to the earth's gravitational field, though magnetic north may be used as a reference direction in some situations. Though this context is different, and the meaning of azimuth here is somewhat different, this use is consistent with the traditional meaning and use of the term azimuth. If the longitudinal direction of the borehole at the measurement point is equated to the vertical direction in the traditional context, then the determination of an azimuth in the borehole imaging context is essentially the same as the traditional azimuthal determination.

Another important label used in the borehole imaging context is the "tool face angle". When a measurement tool is used to gather azimuthal imaging data, the point of the tool with the measuring sensor is identified as the "face" of the tool. The tool face angle, therefore, is defined as the angular separation from a reference point to the radial direction of the tool face. The assumption here is that data gathered by the measuring sensor will be indicative of properties of the formation along a line or path that extends radially outward from the tool face into the formation. The tool face angle is an azimuth angle, where the measurement line or direction is defined for the position of the tool sensors. In the remainder of this document, the terms azimuth and tool face angle will be used interchangeably.

With reference now to FIG. 1, an exemplary offshore drilling assembly, generally denoted 10, suitable for employing exemplary method embodiments in accordance with the present invention is illustrated. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a bottom hole assembly (BHA) having a drill bit 32, a measurement/logging while drilling (MLWD) tool 100, an imaging sub 150, and a telemetry sub 190 coupled thereto.

It will be appreciated that as used in the art, there is not always a clear distinction between the terms LWD and MWD. However, MWD often refers to measurements taken for the purpose of drilling the well (e.g., navigation measurements) and characterizing the borehole (e.g., via caliper measurements), whereas LWD often refers to measurement taken for the purpose of analysis of the formation and surrounding borehole conditions (e.g., formation property measurements including resistivity, acoustic velocity, and neutron density measurements). Notwithstanding, the term "LWD" will be used herein to refer to both MWD and LWD measurements. The term "logging" likewise refers herein to both formation and borehole property measurements.

LWD tool 100 typically includes at least one LWD sensor 110 deployed thereon. LWD sensor 110 may include substantially any downhole logging sensor, for example, including a natural gamma ray sensor, a neutron sensor, a density sensor, a resistivity sensor, a formation pressure sensor, an annular pressure sensor, an ultrasonic sensor, an audio-frequency acoustic sensor, and the like. Imaging sub 150 includes at least one tool face (azimuth) sensor 160 deployed thereon. Tool face sensor 160 may include substantially any sensor that is sensitive to sensor tool face (e.g., relative to the high side of the borehole, magnetic north, etc.), such as one or more accelerometers and/or magnetometers. As described in more detail below, LWD tool 100 and imaging sub 150 may be configured to acquire azimuthally sensitive sensor measurements of one or more borehole properties (e.g., formation resistivity). Telemetry sub 190 may include substantially any conventional telemetry system for communicating with the surface, such as a mud pulse telemetry system and may likewise employ substantially any suitable encoding scheme. Drill string 30 on FIG. 1 may further include a downhole drill motor and other logging and/or measurement while drilling tools, such as surveying tools, formation sampling tools, directional drilling tools, and the like.

It will be understood by those of ordinary skill in the art that methods in accordance with the present invention are not limited to use with a semisubmersible platform 12 as illustrated in FIG. 1. Methods in accordance with this invention are equally well suited for use with any kind of subterranean drilling operation, either offshore or onshore.

LWD tool 100 may further optionally include an energy source (not shown). For example, an LWD tool configured for azimuthal gamma measurements may include a gamma radiation source (such a device is typically referred to as a density measurement device). Likewise, LWD tools configured for azimuthal resistivity and acoustic velocity measurements may include one or more electromagnetic wave generators and acoustic transmitters, respectively. The invention is not limited, however, to the use of an energy source since the LWD sensor 110 may be utilized to measure naturally occurring formation parameters (e.g., a natural gamma ray sensor may be utilized to measure azimuthally sensitive natural gamma ray emissions).

In the exemplary embodiment shown in FIG. 1, the LWD sensor 110 and the tool face sensor 160 are deployed in separate tools. It will be appreciated that the invention is not limited in this regard. For example, LWD tool 100 may include a tool face sensor deployed therein. Tool face sensor 160 may also be deployed elsewhere in the drill string 30.

With continued reference to FIG. 1, downhole tool 100 and/or imaging sub 150 typically further includes a controller (not shown), e.g., having a programmable processor (not shown), such as a microprocessor, digital signal processor, or a microcontroller and processor-readable or computer-readable program code embodying logic. A suitable processor may be utilized, for example, to pixilate traces of sensor data. The processor is typically further utilized to compress the data in accordance with this invention, for example, by applying a suitable transform to the sensor data. The processor may be further utilized to encode the compressed data prior to transmission to the surface. A suitable controller may also optionally include other controllable components, such as sensors (e.g., a depth sensor), data storage devices, power supplies, timers, and the like. The controller is also typically disposed to be in electronic communication with sensors 110 and 160. A suitable controller may also optionally communicate with other instruments in the drill string, such as telemetry sub 190. A typical controller may further optionally include volatile or non-volatile memory or a data storage device.

In general, an image may be thought of as a two-dimensional representation of a parameter value. A borehole image is typically thought of as a two-dimensional representation of a measured formation (or borehole) parameter as a function of sensor tool face and time. Time is typically correlated with a borehole depth value at the surface because such a borehole depth value is typically not accessible within the imaging sub. Such borehole images thus convey the dependence of the measured formation (or borehole) parameter on tool face and depth. It will therefore be appreciated that one purpose in forming such images of particular formation or borehole parameters (e.g., formation resistivity, dielectric constant, density, acoustic velocity, standoff, etc.) is to determine the actual azimuthal dependence of such parameters as a function of the borehole depth. Exemplary embodiments of this invention may advantageously enable timely transmission of such dependencies to the surface.

Figure 2:
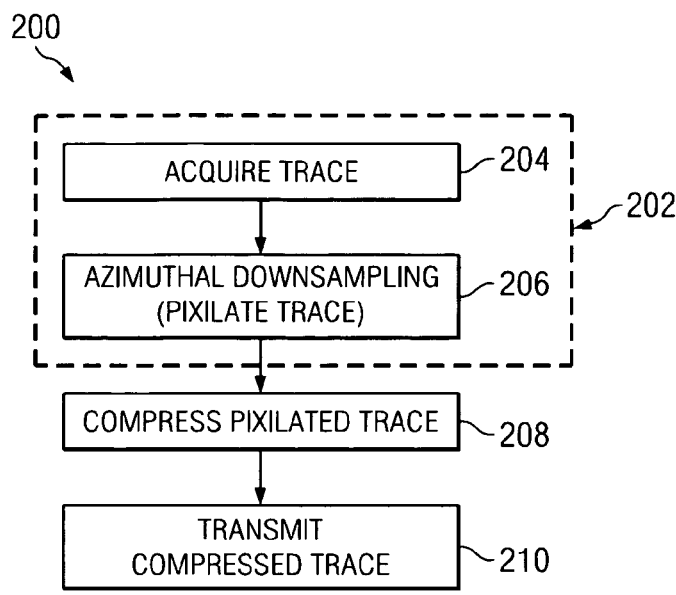
FIG. 2 depicts a flowchart of one exemplary method embodiment in accordance with the present invention.

With reference now to FIG. 2, one exemplary embodiment of a data compression method 200 in accordance with the present invention is illustrated. A single, pixilated trace of sensor data is acquired at 202. This pixilated trace is then compressed in accordance with the invention at 208 and transmitted to the surface at 210. It will be appreciated that the present invention advantageously compresses and transmits (at 208 and 210) a single trace of sensor data. Prior art methods, for example as described above, require the compression of multiple traces (a two-dimensional image), which tends to increase latency.

With continued reference to FIG. 2, the pixilated trace of sensor data may be acquired at 202, for example, via azimuthally down-sampling 206 the raw sensor data acquired at 204. Exemplary azimuthal down-sampling techniques include conventional binning or windowing techniques (commonly assigned U.S. Pat. No. 7,027,926 to Haugland discloses a suitable windowing technique). Raw sensor data may be acquired 204, for example, via one or more sensors deployed on an outer surface of an LWD tool deployed in a borehole (e.g., sensor 110 on LWD tool 100 shown on FIG. 1). As is known to those of ordinary skill in the art, such sensors are typically disposed to make substantially continuous measurements of a formation property (adjacent the sensor) as the LWD tool rotates (with the drill string) in the borehole. In one exemplary embodiment, a continuous LWD sensor response may be averaged at some predetermined sampling interval (e.g., 10 milliseconds). The duration of each sampling interval is preferably significantly less than the period of the tool rotation in the borehole (e.g., the sampling interval may be about 10 milliseconds, as stated above, while the rotational period of the tool may be about 0.5 seconds). Meanwhile, a tool face sensor (e.g., sensor 160 shown on FIG. 1) continuously measures the tool face of the LWD sensor as it rotates in the borehole. The averaged LWD sensor response in each of the sampling intervals may then be tagged with a corresponding tool face and time and saved to memory.

Sensor data for determining the azimuthal dependence of the measured formation parameter at a particular (single) well depth are typically gathered and grouped during a predetermined time period. The predetermined time period is typically significantly longer than both the above described rapid sampling time and the rotational period of the tool (e.g., the time period may be 10 seconds, which is 1000 times longer than the 10 millisecond rapid sampling time and 20 times longer than the 0.5 second rotational period of the tool). The data acquired during the single time period (e.g., within the 10 second interval) represents a single "trace" of sensor data. Each trace of data is typically azimuthally down-sampled 206 (FIG. 2) via a conventional binning or windowing algorithm after acquisition. Such down-sampling essentially pixilates the trace in azimuth (tool face). For example, a single trace of sensor data acquired at 204 may include 1000 data pairs (a single data pair every 10 milliseconds over an interval of 10 seconds). At 206, these data pairs may be azimuthally down-sampled, for example, into 16 discrete azimuthal pixels. Of course, the invention is not limited to any number of azimuthal pixels. Nor is the invention limited to any particular rapid sampling and/or time periods. The invention is also not limited to the use of any particular windowing or binning algorithms.

To form a two-dimensional image, it will be understood that multiple pixilated traces are required. Such traces are typically acquired during consecutive time periods (although the invention is not limited in this regard). As described above, prior art compression algorithms require the compression of a two-dimensional image (i.e., including multiple pixilated traces). Such a methodology necessarily tends to result in unacceptably high latency. In contrast to the prior art, the present invention compresses and transmits the data one pixilated trace at a time (as shown at 208 and 210 of FIG. 2). The invention therefore advantageously significantly reduces latency.

Although the exemplary image acquisition technique described above involves rotating a sensor in the borehole, it will be understood that the invention is not limited in this regard either. Images may also be obtained, for example, in sliding mode by utilizing downhole tools having multiple sensors distributed about the periphery of the tool.

Figure 3:
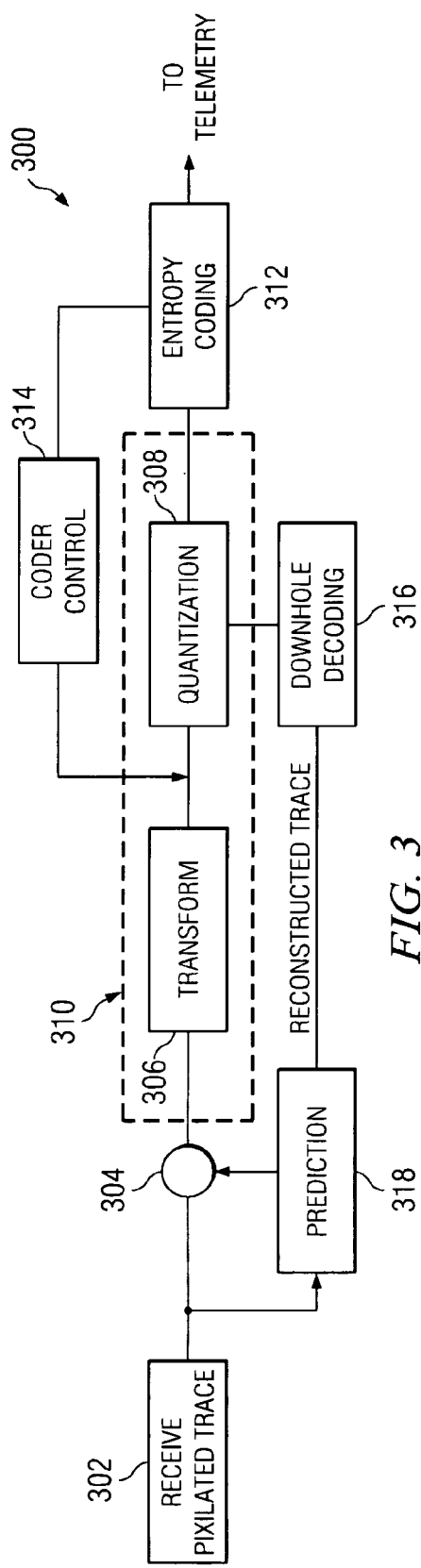
FIG. 3 depicts a flowchart of one exemplary data encoding embodiment in accordance with the present invention.
Figure 4:
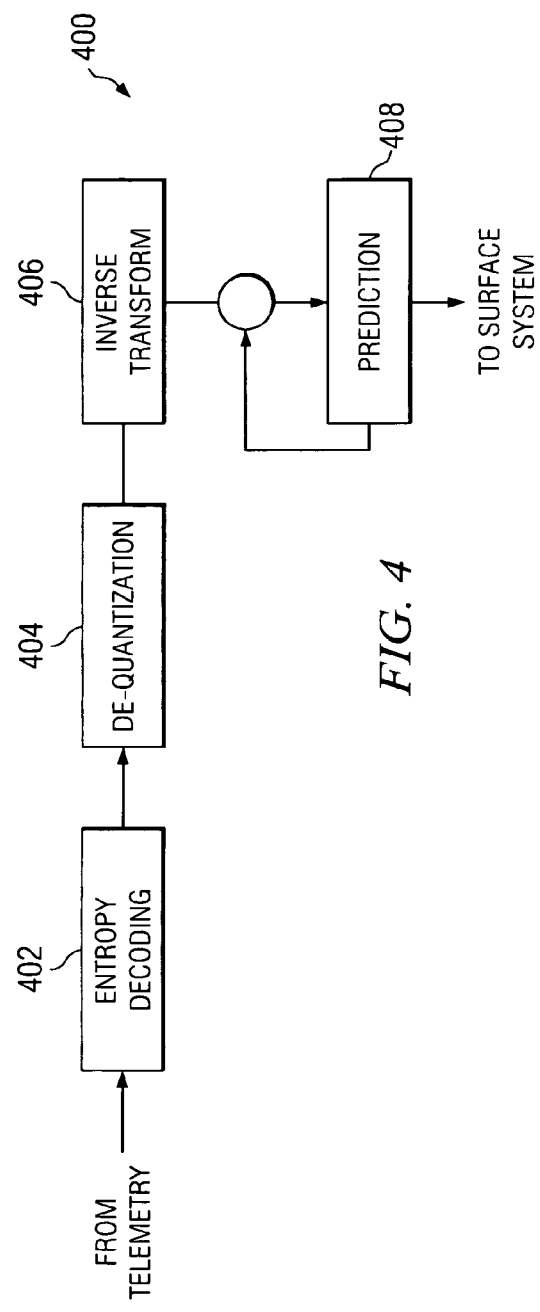
FIG. 4 depicts a flowchart of one exemplary data decoding embodiment in accordance with the present invention.

With reference now to FIGS. 3 and 4, the basic structures of exemplary downhole encoding (FIG. 3) and surface decoding (FIG. 4) embodiments are shown. As shown, the encoder 300 is configured to output a bit stream to the downhole telemetry system while the decoder 400 is configured to receive the bit stream at the surface and reconstruct the pixilated trace.

The exemplary encoder 300 shown on FIG. 3 may be thought of as including four blocks (or four major components): (i) transform and quantization shown at 310, (ii) entropy coding shown at 312, (iii) prediction and downhole decoding shown at 316 and 318 and (iv) coder control shown at 314. These encoding blocks are described in more detail below under separate headings. In the exemplary embodiment shown, the encoder first compares the incoming pixilated trace 302 to a decoded prediction of the previous pixilated trace at 304. The residuals are then transformed and quantized at 306 and 308 to obtain quantized coefficients of the residuals. The transform step 306 and quantization step 308 are shown as (and may be thought of as) a joint operation at 310 for reasons discussed in more detail below in JOINT TRANSFORM AND QUANTIZATION DESIGN. The quantized coefficients are then entropy coded at 312 and output a bit stream representative of the quantized coefficients to the downhole telemetry system. The exemplary embodiment shown includes a coder control block 314 for maintaining the bit stream at a substantially constant rate (i.e., an approximately constant number of bits per pixilated trace). A downhole decoding 316 and prediction 318 block decodes the quantized coefficients and predicts a reconstructed pixilated trace for comparison with the next pixilated trace at 304. It will be appreciated that the invention is not limited to encoding embodiments including each of the above described four blocks. For example, suitable embodiments of the invention may include only the transform/quantization block shown at 310. Other suitable embodiments may include only two or three of the four blocks.

The exemplary decoder 400 shown on FIG. 4 first performs an entropy decoding process for the quantized coefficients at 402, followed by a de-quantization process to recover the coefficients at 404. The decoder then performs an inverse transform 406 on the recovered coefficients to obtain the reconstructed residuals. The reconstructed residuals are then combined with the predictor from a previous trace at 408 to ultimately reconstruct the pixilated trace. In the exemplary embodiment shown, the prediction model 408 utilizes both the predictor and the reconstructed residuals to generate the pixilated trace. It will be appreciated that the invention is not limited by the above described decoder 400. Those of skill in the art will readily appreciate that a suitable decoder does not necessarily include elements beyond those that are necessary to decode the bit stream output from the encoder 300.

Joint Transform and Quantization

As described above, the present invention compresses and transmits LWD image data one pixilated trace at a time. In one exemplary embodiment of the invention, such compression includes transforming the trace with a two-dimensional transform such as a Karhunen-Loeve like transform (a KL-like transform). In these embodiments, the one-dimensional trace is typically first reorganized into a two-dimensional form to enable more efficient compression. It will be appreciated that the individual pixels in an LWD trace reflect formation characteristics at various azimuthal positions around a circular borehole. Thus, the first pixel is not only closely correlated with the second pixel, but also with the last pixel (i.e., the trace is continuous such that pixel a0 is a nearest neighbor with both a1 and a15 in FIG. 5A). One aspect of the present invention is the realization that this circular autocorrelation of an LWD trace enables reorganization of the trace from a one-dimensional to a two-dimensional matrix. By reorganizing the pixilated trace into a two-dimensional format, a two-dimensional transform can better compact the signal energy into fewer large coefficients, which tends to facilitate better compression of the trace with better exploitation of the data correlation.

Figure 5A:
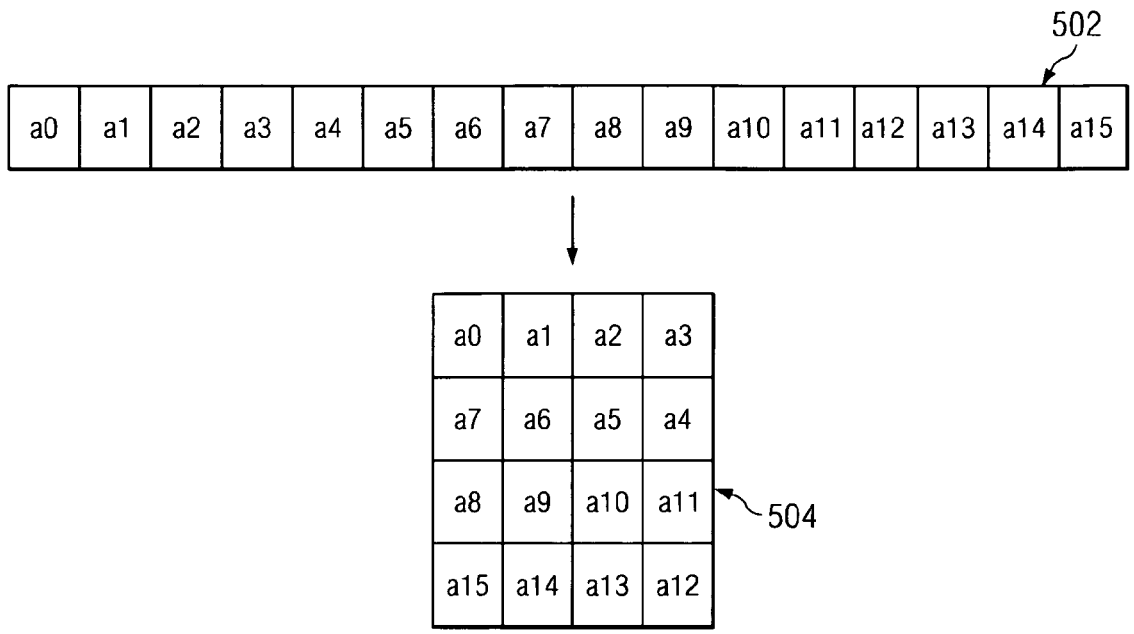
FIGS. 5A and 5B depict exemplary data reorganizing schemes in accordance with the present invention.
Figure 5B:
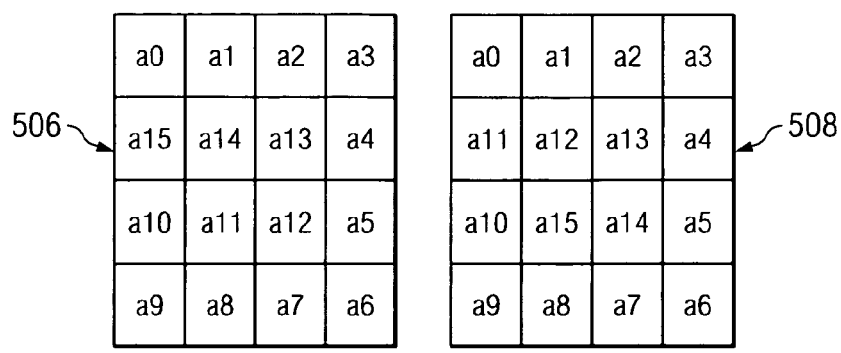

Turning now to FIG. 5A, one exemplary embodiment of a data reorganization scheme is illustrated. In the exemplary embodiment shown, a 16-pixel trace 502 is reorganized into a two-dimensional 4x4 matrix 504. As shown the trace runs forward in rows 0 and 2 and backwards in rows 1 and 3. By this reorganization, pixel a0 is only three pixels removed from pixel a15 (as compared to 15 pixels in the linear representation). Moreover, each of the other pixels has their closest correlated pixels as direct neighbors along either a row or a column. In actual implementation, such reorganization is efficiently realized by two look-up tables: (i) on a block-scan table for the forward transform and (ii) an inverse block-scan table for the inverse transform in which the scanning tables map between one-dimensional positions and two-dimensional coordinates. It will be understood that since the data reorganization may be accomplished via such look-up tables, there is no need to show a data reorganization step in FIG. 3. It will also be understood by those of ordinary skill in the art that the invention is not limited to the particular re-organization scheme 504 shown on FIG. 5A. Other re-organization schemes may likewise be utilized. For example, two alternative reorganization schemes 506 and 508 are shown on FIG. 5B. Reorganization schemes 506 and 508 are similar to scheme 504 in that the interior pixels (a1 through a14) have their closest correlated pixels as direct neighbors along either a row or a column. In scheme 506 all of the pixels (a0 through a15) have their closest correlated pixels as direct neighbors. Those of ordinary skill in the art will readily be able to conceive of still further alternative reorganization schemes. Such alternative embodiments are considered to be well within the scope of the invention.

With reference again to FIG. 3, the reorganized data may be transformed, for example, as follows:

$$Y = H_F(XH_F^T)$$ Equation 1 where X represents a two-dimensional matrix of the reorganized trace (for example as shown on FIGS. 5A and 5B), Y represents the transformed trace (also referred to as the coefficients), $H_F$ represents a suitable two-dimensional, forward transform, and $H_F^T$ represents the transpose of the forward transform.

In Equation 1, $H_F$ may include substantially any suitable transform, for example, including Karhunen-Loeve, Discrete Cosine, and wavelet transforms. Certain advantageous embodiments utilize a non-orthogonal transform. Those of ordinary skill in the art will readily recognize that a non-orthogonal transform is one in which the transform matrix times its transpose does not equal the identity matrix. In one exemplary embodiment, a non-orthogonal KLT-like transform may be utilized. Relaxation of the orthogonality constraint advantageously enables the transform matrix elements to be selected such that (i) efficient computation of Equation 1 may be realized and (ii) the circular symmetry commonly observed in LWD data may be maintained. Due to the limited processing power of typical downhole processors, efficient computation of Equation 1 is important for achieving low latency compression and transmission of the LWD sensor data. Such efficient computation may be further achieved, for example, via selecting rational, or more preferably integer, transform matrix elements.

An advantageous transform may also be selected such that Equation 2 is satisfied:

$$H_I \text{diag}[\alpha,\beta,\alpha,\beta] H_F = I$$ Equation 2 where $H_F$ is defined with respect to Equation 1, $H_I$ represents an inverse transform, I represents the identity matrix, and $\text{diag}[\alpha,\beta,\alpha,\beta]$ represents a diagonal matrix having scaling factors $\alpha$ and $\beta$ (the scaling factor $\alpha$ is applied to columns 0 and 2, while the scaling factor $\beta$ is applied to columns 1 and 3). The scaling factors are advantageously bounded rational numbers that are close to one another (e.g., within a factor of two). For example, in the exemplary transform matrix shown in Equation 3, $\alpha=\frac{1}{16}$ and $\beta=\frac{1}{29}$. Those of ordinary skill in the art will readily recognize that the constraint given in Equation 2 may be similarly expressed with the transpose matrix $H_F^T$ replacing the inverse matrix $H_I$. This results in a diagonal scaling matrix having scaling factors $\alpha'$ and $\beta'$. For the exemplary transform described below in Equation 3 $\alpha'=\alpha/4$ and $\beta'=\beta/2$.

Three exemplary and suitable non-orthogonal, KLT-like transforms that satisfy Equation 2 are given as follows:

$$H_F(1) = \begin{pmatrix} 4 & 4 & 4 & 4 \\ 5 & 2 & -2 & -5 \\ 4 & -4 & -4 & 4 \\ 2 & -5 & 5 & -2 \end{pmatrix} \quad \text{Equation 3}$$

$$H_F(2) = \begin{pmatrix} 25/2 & 25/2 & 25/2 & 25/2 \\ 17 & 6 & -6 & -17 \\ 25/2 & -25/2 & -25/2 & 25/2 \\ 6 & -17 & 17 & -6 \end{pmatrix} \quad \text{Equation 4}$$

$$H_F(3) = \begin{pmatrix} 25/2 & 25/2 & 25/2 & 25/2 \\ 15 & 5 & -5 & -15 \\ 25/2 & -25/2 & -25/2 & 25/2 \\ 5 & -15 & 15 & -5 \end{pmatrix} \quad \text{Equation 5}$$

The transformation shown in Equation 3 is preferred for downhole imaging applications in part because each matrix element is an integer (which as described above reduces downhole computational requirements). It will be appreciated that scaled versions of the transforms shown in Equations 3-5 may be acquired by multiplying or dividing each matrix element by a common factor (e.g., by an integer value). However, the matrix elements depicted are generally preferred in that they are integer (or nearly integer) and suitable for use with a 16-bit processor. It will also be appreciated that the transforms shown in Equations 4 and 5 may be scaled so that each matrix element is an integer (e.g., by multiplying each element by an even integer, 2, 4, etc.). However, such scaled versions of the transforms shown in Equations 4 and 5 tend to result in increased downhole computational requirements since the encoding and decoding outputs (during the transformation and inverse transformation steps) are not all within 16-bit range.

For the transform shown in Equation 3, the constraint shown in Equation 2 may be re-written as follows:

$$H_I \text{diag}[\tfrac{1}{16}, \tfrac{1}{29}, \tfrac{1}{16}, \tfrac{1}{29}] H_F = I \quad \text{Equation 6}$$

where diag[•] represents a diagonal matrix having the scaling factors $\frac{1}{16}$ and $\frac{1}{29}$ ($\alpha=\frac{1}{16}$ and $\beta=\frac{1}{29}$), I represents the identity matrix, $H_F$ represents the transform shown in Equation 3 and $H_I$ represents the inverse transform where:

$$H_I = \begin{pmatrix} 1 & 5/2 & 1 & 1 \\ 1 & 1 & -1 & -5/2 \\ 1 & -1 & -1 & 5/2 \\ 1 & -5/2 & 1 & -1 \end{pmatrix} \quad \text{Equation 7}$$

The forward and inverse transforms shown in Equations 3 and 7 advantageously tend to minimize computational requirements during downhole processing. For example, as stated above, the forward transform includes only integer elements. The inverse transform includes addition and sign extended shifts (both right-shift and left-shift operations). Furthermore, since there are no fractions in $H_F$, and since the scaling factors may be compensated by the quantization process as described in more detail below, the loss due to the transform is negligible. Moreover, $H_F$ and $H_I$ may be advantageously utilized with conventional 16-bit processors utilized in downhole tools (e.g., conventional 16-bit DSPs) since all encoding and decoding outputs are within 16-bit range.

For the exemplary transform shown in Equation 4, the scaling factors $\alpha$ and $\beta$ in matrix diag$[\alpha,\beta,\alpha,\beta]$ are $\alpha=\frac{1}{26}$ and $\beta=\frac{1}{25}$. For the exemplary transform shown in Equation 5, the scaling factors $\alpha$ and $\beta$ are $\alpha=\frac{1}{5}$ and $\beta=\frac{1}{4}$.

With continued reference to FIG. 3, the transformed coefficients (Y in Equation 1) are typically quantized as shown at 308. One suitable quantization embodiment may be represented mathematically, for example, as follows:

$$Y_Q(i,j) = \text{sign}[Y(i,j)] \frac{|(i,j)M(Q_m,i,j) + 2^{(k-1+Q_r)}|}{2^{(k+Q_r)}} \quad \text{Equation 8}$$

where $Y(i,j)$ represent the individual coefficients of the matrix Y (at row i and column j in Y), $Y_Q(i,j)$ represent the individual quantized coefficients, $M(Q_m,i,j)$ represents a quantization scaling matrix which is described in more detail below, and $Q_e$ and $Q_m$ represent quantization parameters which are also described in more detail below.

The corresponding de-quantization matrix may be represented mathematically, for example, as follows:

$$Y_D(i,j) = Y_Q(i,j) S(Q_m,i,j) 2^{Q_e} \quad \text{Equation 9}$$

where $Y_Q(i,j)$, $Q_e$ and $Q_m$ are as defined above with respect to Equation 8, $Y_D(i,j)$ represents the de-quantized coefficients, and $S(Q_m,i,j)$ represents a de-quantization scaling matrix as described in more detail below.

It will be appreciated that Equations 8 and 9 are configured for scalar quantization and de-quantization for independent, uniformly distributed coefficients. Those of ordinary skill will readily recognize that other mathematical formulas can be used for different distribution models (e.g., a generalized Gaussian distribution on DCT coefficients). Such other quantization and de-quantization formulas can be readily obtained by following the well known optimization process for scalar quantization (see, for example, Yun Q. Shi and Huifang Sun, *Image and Video Compression for Multimedia Engineering: Fundamentals, Algorithms, and Standards*, Chapter 2, CRC Press, 1999).

In one exemplary embodiment suitable for downhole applications, the quantization parameter is set to be within the range 0-31 (up to 5 bit), with a coarser quantization step size of 5. The quantization parameters $Q_e$ and $Q_m$ may then be determined as follows: $Q_e = \lfloor Q_P/5 \rfloor$ and $Q_m = Q_P \% 5$ where $Q_P$ represents an adjustable quantization parameter describe in more detail in CODER CONTROL, "$\lfloor \cdot \rfloor$" represents the flooring function such that $Q_P/5$ is truncated to an integer value (i.e., $Q_e$ equals the largest integer less than $Q_P/5$), and "%" represents the integer modulo operation. Those of ordinary skill will readily recognize that $Q_e$ is equal to the integer quotient of $Q_P/5$, while $Q_m$ is equal to the integer remainder. For example, when $Q_p=14$, then $Q_e=2$ and $Q_m=4$. The invention is, of course, no limited in these regards.

With continued reference to Equations 8 and 9, the M and S matrices may be advantageously configured to account for the scaling factors introduced during transformation. Given the dynamic source range (i.e., the dynamic range of the source data) a scaling number may be selected so that rounding errors on division are small. In one exemplary LWD density imaging application, the source data has a 7-bit dynamic range. For this application, a scaling number of $2^{23}$ may be selected such that:

$$M(Q_m,r)S(Q_m,r)v(r) \approx 2^{23} \qquad \text{Equation 10}$$

where v(r) represents the scaling factor. With reference back to Equations 1-3, it will be appreciated that a first group of coefficients Y(0,0), Y(0,2), Y(2,0), and Y(2,2) all have the same scaling factor of $(1/\alpha)^2$ (i.e., v(0)=16×16=256 for the exemplary transformation shown in Equation 3). Similarly, a second group of coefficients Y(1,1), Y(1,3), Y(3,1), and Y(3,3) all have the same scaling factor of $(1/\beta)^2$ (i.e., v(1)=29×29=841 for the exemplary transformation shown in Equation 3). The remainder of the coefficients (a third group) have the scaling factor $(1/\alpha)(1/\beta)$ (i.e., v(2)=16×29=464 for the exemplary transformation shown in Equation 3). Thus, both M and S have 3 columns. M and S also both have 5 rows due to the selection of a coarser quantization step size of 5. It will be understood that the invention is not limited in these regards. It will be appreciated that the scaling number $2^{23}$ is coupled with k in Equation 8 as well as with the coarser quantization step size of 5 such that k+5=23. It will be further appreciated that since the transform scaling factors are taken into account during quantization, the transform 306 and quantization 308 steps may be thought of as a single step as shown at 310. The invention is, of course, not limited in these regards.

Exemplary quantization and de-quantization matrices may therefore be given as follows:

$$M = \begin{pmatrix} 2048 & 831 & 904 \\ 1725 & 665 & 753 \\ 1489 & 587 & 646 \\ 1260 & 525 & 565 \\ 1130 & 475 & 502 \end{pmatrix} \quad S = \begin{pmatrix} 13 & 12 & 20 \\ 19 & 15 & 24 \\ 22 & 17 & 28 \\ 26 & 19 & 32 \\ 29 & 21 & 36 \end{pmatrix} \qquad \text{Equation 11}$$

It should be noted that the exemplary quantization and de-quantization processes described above advantageously do not include any division steps. Moreover, the computations, including all intermediate values, advantageously fall within 32 bit range, with Y, Y', and $Y_Q$ being within 16 bit range.

It will be appreciated that the elements in the quantization and de-quantization matrices (M and S) depend on the particular transformation $H_F$ utilized (due to the unique scaling factors). As described above, the quantization and de-quantization matrices shown in Equation 11 are configured for use with the transform shown in Equation 3. When the transform shown in Equation 4 is utilized, the first group of coefficients Y(0,0), Y(0,2), Y(2,0), and Y(2,2) has the scaling factor v(0)=25×25=625 (i.e., $(1/\alpha)^2$). The second group of coefficients Y(1,1), Y(1,3), Y(3,1), and Y(3,3) has the scaling factor v(1)=26×26=676 (i.e., $(1/\beta)^2$). The remainder of the coefficients (the third group) have the scaling factor v(2)=25×26=650 (i.e., $(1/\alpha)(1/\beta)$). When the transform shown in Equation 5 is utilized, the first group of coefficients Y(0,0), Y(0,2), Y(2,0), and Y(2,2) has the scaling factor v(0)=5×5=25 (i.e., $(1/\alpha)^2$). The second group of coefficients Y(1,1), Y(1,3), Y(3,1), and Y(3,3) has the scaling factor v(1)=4×4=16 (i.e., $(1/\beta)^2$). The remainder of the coefficients (the third group) have the scaling factor v(2)=5×4=20 (i.e., $(1/\alpha)(1/\beta)$).

During de-coding (for example at step 316 in FIG. 3 or step 404 in FIG. 4), an inverse transform step follows the de-quantization of the quantized coefficients (Equation 9). The inverse transform may be represented mathematically, for example, as follows (where $X_R$ represents the matrix of reconstructed pixels, i.e., the reconstructed trace):

$$X_R = H_f(Y_D H_f^T) \qquad \text{Equation 12}$$

The final reconstructed trace may be obtained, for example, by performing the following sign shift operation:

$$X_R(i,j) = \frac{(X_R(i,j) + 16)}{32} \qquad \text{Equation 13}$$

The division by 32 (via a sign extended right shift by 5) is due to the fact that the scaling number ($2^{23}$) in Equation 10 holds for all paired elements of M and S at the same (i,j) coordinates.

Equations 1 through 13 describe one exemplary compression methodology in accordance with the invention in which a single pixilated trace (represented by the matrix X) may be compressed and reconstructed. In other exemplary embodiments, a difference between sequential traces may be compressed and transmitted to the surface. The difference between sequential traces is referred to herein as a residual. FIG. 3 illustrates one such embodiment in which the residuals are determined at 304 and compressed at 310. Compression of trace residuals is described in more detail below in PREDICTION AND DOWNHOLE DECODING.

Entropy Coding

With reference again to FIG. 3, the quantized coefficients (e.g., obtained from Equation 8) are entropy encoded at 312 and then transmitted to the surface. Owing to both (i) the severe bandwidth limitations of convention mud pulse telemetry techniques and (ii) the desirability of reducing latency, the entropy coding process typically encodes relatively few quantized coefficients. In order to achieve entropy encoding, transmission, and decoding, a prefix free, variable length coding (VLC) method with an embedded universal coded is employed. It will be appreciated, however, that the invention is not limited to any particular entropy encoding technique.

With reference now to TABLE 1, one exemplary entropy encoding process suitable for use in LWD imaging applications is shown. The exemplary embodiment shown is configured for a 4×4 matrix of quantized coefficients. Of course, the invention is not limited in this regard. During the encoding process, the 4×4 matrix of quantized coefficients is encoded quadrant by quadrant, beginning with the upper left-hand quadrant and ending with the lower right-hand quadrant. The exemplary encoding process described herein includes the following three steps: (i) coefficient pattern recognition, (ii) encoding of the pattern, and (iii) encoding of the coefficients. This process is described below for a single quadrant, however it will be appreciated that the process is repeated for each quadrant in the matrix.

TABLE 1

| | | |
|---|---|---|
| $A_0$ | $\begin{pmatrix} 0 & 0 \\ 0 & 0 \end{pmatrix}$ | 1 |
| $A_1$ | $\begin{pmatrix} 1 & 0 \\ 1 & 0 \end{pmatrix}$ | 010 |
| $A_2$ | $\begin{pmatrix} 1 & 0 \\ 0 & 0 \end{pmatrix}$ | 011 |

TABLE 1-continued

| | | |
|---|---|---|
| $A_3$ | $\begin{pmatrix} 1 & 0 \\ 1 & 1 \end{pmatrix}$ | 00011 |
| $A_4$ | $\begin{pmatrix} 1 & 1 \\ 1 & 0 \end{pmatrix}$ | 00000 |
| $A_5$ | $\begin{pmatrix} 1 & 1 \\ 0 & 1 \end{pmatrix}$ | 00001 |
| $A_6$ | $\begin{pmatrix} 1 & 1 \\ 1 & 1 \end{pmatrix}$ | 00010 |
| $A_7$ | All Other | 011 + Matrix |

The general design principle, as is known to those of skill in the art, is that patterns with a high probability of occurrence are encoded with fewer bits, while those with a lower probably of occurrence are encoded with more bits. With continued reference to TABLE 1, seven exemplary quadrant patterns are shown at $A_0$ through $A_6$. In these patterns, a 0 represents a quantized coefficient having a value of 0, while a 1 represents a quantized coefficient having a non-zero value. Due to the high degree of compression required in LWD imaging applications, the most likely occurrence is typically a quadrant having four zero valued coefficients as shown at $A_0$ (the transmission of residuals as described above) also promotes the occurrence of quadrants having four zero-valued coefficients). Thus, this occurrence is encoded with a single bit. The shown at $A_1$ and $A_2$ are typically the next most likely and are encoded with three bits each (010 and 011 respectively). The patterns shown at $A_3$ through $A_6$ have a relatively low probability of occurrence and are encoded with five bits each (00011, 00000, 00001, and 00010 respectively). All remaining patterns, which are the least likely to occur, are lumped together at $A_7$. These patterns are encoded using seven bits (011abcd where the pattern is represented by the following matrix:

$$\begin{pmatrix} a & b \\ c & d \end{pmatrix}).$$

It will be appreciated that the invention is not limited to any particular probabilities or pattern encoding. While certain patterns have been observed to have the greatest probabilities in LWD imaging applications, it is anticipated that the particular encoding scheme may be changed (even within a single drilling operation) depending upon the nature of the acquired image data. It will also be appreciated that the invention is not limited to the use of pattern encoding. For example, each quadrant may simply be encoded using four bits (abcd).

After pattern encoding, the non-zero coefficients are encoded (with the exception of the $A_0$ pattern that does not include any non-zero coefficients). In one exemplary embodiment, conventional Huffman encoding is utilized to encode coefficient values in the range from 1 to 6. Coefficients having a value of greater than or equal to 7 may be encoded using conventional Fibonacci code. The use of Fibonacci code advantageously aids in the identification of telemetry transmission errors. Since Fibonacci code is terminated by two consecutive 1's, a zero indicates the continuation of the current coefficient. A bit error (or close by scattered errors) only affects, at most, two symbols, one of which is the lost symbol and the other of which is corrupted. These types of scenarios are almost always detectable. Since relatively large coefficients are most probably the DC coefficient, bit errors will most likely only affect the smaller (AC) coefficients which carry less information.

Entropy decoding is performed at the surface as shown at 402 on FIG. 4. In one exemplary embodiment the entropy decoding process includes a VLC lookup table which matches both the code and the code length. The entropy decoding process 402 outputs the quantized coefficients for de-quantization and inverse transform at 404 and 406. It will be appreciated that the entropy decoding is not typically performed by the downhole decoder since the entropy coding process is lossless.

Prediction and Downhole Decoding

With reference again to FIGS. 3 and 4, the quantized coefficients may be decoded both uphole and downhole using substantially identical algorithms. One exemplary de-quantization process is described above with respect to Equation 9, while an exemplary inverse transform is described above with respect to Equations 7, 12, and 13.

FIG. 3 depicts a differential encoding methodology (in which the difference between first and second pixilated traces is encoded rather than the absolute values of the pixilated traces). In a typical scheme, the absolute value of a first pixilated trace may be encoded and transmitted to the surface. Instead of encoding the absolute value of the second pixilated trace, the difference between the second and first traces may be encoded and transmitted. Then the difference between the third and second traces is encoded and transmitted. And so on. It will be appreciated that at some interval (e.g., every k traces) the absolute value of a pixilated trace is encoded and transmitted to reduce compounding errors.

Referring again to FIG. 3, the quantized coefficients are de-quantized and inverse transformed downhole at 316 to re-construct residuals from the current pixilated trace. These residuals are then combined with the previous trace to acquire a re-construction of the current pixilated trace. This reconstructed trace is utilized at 318 as a predictor for the next pixilated trace. Substantially any prediction algorithm may be used. In one exemplary embodiment the predictor (reconstructed trace described above) is subtracted from the pixilated trace newly acquired at 302, for example, as follows:

$$X'_{m+1} = X_{m+1} - X_{R,m} \qquad \text{Equation 14}$$

where $X'_{m+1}$ represents the residuals for trace number m+1, $X_{m+1}$ represents trace number m+1, and $X_{R,m}$ represents the reconstructed trace number m. The reconstructed trace $X_{R,m}$ may be readily obtained from the residuals upon surface decoding, for example, as follows:

$$X_{R,m} = X'_{R,m} + X_{R,m-1} \qquad \text{Equation 15}$$

where $X'_{R,m}$ represents the reconstructed residuals for trace number m and $X_{R,m-1}$ represents the reconstructed trace number m−1.

The resulting residuals X' may then be transformed and quantized, for example, as described above in JOINT TRANSFORM AND QUANTIZATION. It will be appreciated that the matrices X and $X_R$ (representing the pixilated trace and the reconstructed trace) in Equations 1, 12, and 13 may be replaced by X' and $X'_R$ (which represent the residuals and reconstructed residuals respectively). It will also be appreciated by those of ordinary skill that that in embodiments in which residuals are compressed and transmitted Y, $Y_Q$, and $Y_D$, (in Equations 1, 8, 9, and 12) represent the coefficients, quantized coefficients, and de-quantized coefficients of the residuals. Such compression and transmission of residuals is often advantageous in that it tends to enable improved compression efficiency, especially in drilling operations in which there is minimal change in the LWD imaging data from one trace to the next.

Coder Control

As described above, coder control may be employed to maintain the output bit stream at a substantially constant rate (e.g., an approximately constant number of bits per pixilated trace). Since (in the absence of coder control) the above described encoding process tends to generate a varying number of bits per pixilated trace, the use of a coder control scheme may be advantageously utilized to provide an approximately constant rate bit stream to the telemetry module.

With reference again to FIG. 3, coder control block 314 is configured to receive a bit count from the entropy coding block 312. Based on the bit count, the coder control either approves the bit stream for transmission or adjusts a quantization parameter from re-quantization of the coefficients. For example, if the encoded trace includes too many bits, the coder control block 314 may increase the quantization parameter $Q_P$ prior to re-quantization.

Figure 6A:
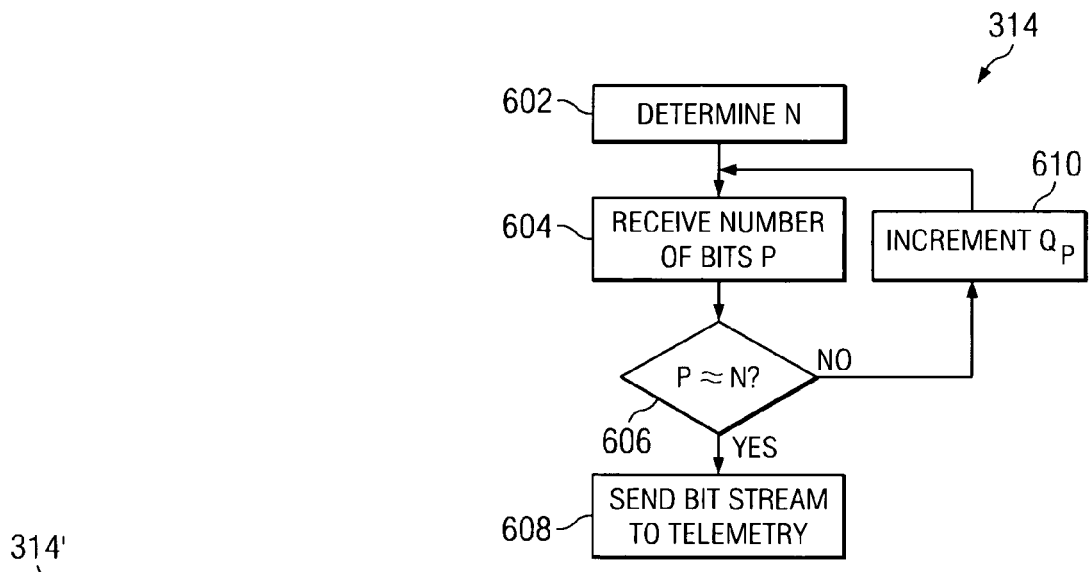
FIGS. 6A and 6B depict exemplary coder control embodiments in accordance with the present invention.
Figure 6B:
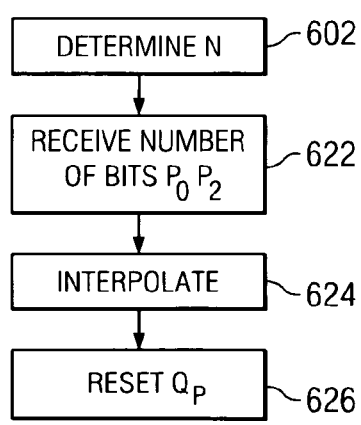

With reference now to FIGS. 6A and 6B, first and second exemplary coder control embodiments 314 and 314' are depicted in flow chart form. Both exemplary embodiments make use of a coded image buffer (CIB) deployed between entropy coder 312 (FIG. 3) and the telemetry system. The CIB receives the bit stream from the entropy coder and feeds a substantially constant rate bit stream to the telemetry system. Coder control embodiments 314 and 314' (FIGS. 6A and 6B) provide feedback to the quantization step 308 based on the fullness of the buffer (with respect to a target fullness). It will be appreciated that the target fullness of the CIB is generally application specific. For example, for a neutron density imaging application having 16 pixels per pixilated trace with a 1 bit/second transmission rate and a 0.25 foot per minute drilling rate (ROP), the maximum target fullness should be less than 40 bits to maintain latency at less than 40 seconds.

In the exemplary coder control embodiments shown on FIGS. 6A and 6B, coder control 314 and 314' first determine a target number of bits n to be sent to the CIB for a given pixilated trace (at 602). This determination may be made mathematically, for example, as follows:

$$n = \omega(F_T - F_C) + \gamma TR \qquad \text{Equation 16}$$

where $F_T$ represents a target CIB fullness, $F_C$ represents a current CIB fullness, T represents a time duration for acquiring a single trace of data, R represents an allocated data transmission rate for the telemetry system, and $\omega$ and $\gamma$ represent adjustable parameters which may, for example, be set equal to 1.

When using the exemplary coder control embodiment 314 shown on FIG. 6A, the quantized coefficients are typically calculated at 308 (FIG. 3) using a middle of the range quantization parameter $Q_P$. After entropy encoding at 312, the encoded trace includes a certain number of bits p which is received at 604 and compared to the target number of bits n at 606. If p is approximately equal to n (i.e., within a predetermined threshold), then the encoded bit stream is sent to the CIB at 608 for transmission to the surface. If p is not equal to n (i.e., the absolute value of the difference is greater than the predetermined threshold), then the quantization parameter $Q_P$ is incremented upwards or downwards at 610 and the coefficients are re-quantized using the new $Q_P$. For the exemplary quantization embodiment described above, $Q_P$ is incremented upwards (to a greater value) when p is greater than n. When p is less than n, $Q_P$ is incremented downwards. This process of making incremental changes to $Q_P$ may be repeated as many times as necessary (provided the downhole tool has sufficient processing power) until a $Q_P$ is found that results in p being approximately equal to n.

When using the coder control embodiment 314' shown on FIG. 6B, the quantized coefficients are typically calculated at 308 (FIG. 3) using both lower and upper values of the quantization parameter $Q_P$ (the lower and upper values are designated as $Q_{P0}$ and $Q_{P2}$). After entropy encoding at 312, the encoded trace includes first and second bit streams, the first including a certain number of bits $p_0$ obtained with quantization parameter $Q_{P0}$ and the second including a certain number of bits $p_2$ obtained with the quantization parameter $Q_{P2}$. These are received at 622 and used to interpolate (at 624) an intermediate quantization parameter $Q_{P1}$ which is selected to result in a bit stream having a number of bits $p_1$ approximately equal to n. $Q_{P1}$ is then used to re-quantize the coefficients which are then sent to the telemetry system after entropy encoding.

Coder control embodiment 314' advantageously makes use of an inverse linear relationship between the quantization parameter $Q_P$ and bit rate. Such an inverse relationship has been previously identified (Z. He and S. Mitra, *A Unified Rate-Distortion Analysis Framework for Transform Coding*, IEEE Trans. On Circuits and Systems for Video Techonology, Vol 11, no. 2, pp. 1221-1236, December 2001). It will be appreciated that coder control embodiment 314' may sometimes preserve downhole processor time as compared to embodiment 314 in that it requires a maximum of only three quantization and entropy encoding steps. Therefore, coder control embodiment 314' may be preferred in certain logging operations, for example, those having higher telemetry rates (e.g., 5-20 bits/second).

Although the present invention and its advantages have been described in detail, it should be understood that various changes, substitutions and alternations can be made herein without departing from the spirit and scope of the invention as defined by the appended claims.

I claim:

1. A method for logging a subterranean borehole, the method comprising:
   (a) acquiring a pixilated trace of sensor data, the pixilated trace including a plurality of borehole parameter values at a corresponding plurality of discrete tool face angles;
   (b) causing the downhole processor to apply a non-orthogonal, KLT-like transform to the pixilated trace to obtain transform coefficients, wherein the transform satisfies the following equation:

$$H_I \text{diag}[\alpha,\beta,\alpha,\beta] H_F = I$$

wherein $H_F$ represents the transform, $H_I$ represents an inverse transform, I represents a mathematical identity matrix, and diag[$\alpha,\beta,\alpha,\beta$] represents a diagonal matrix having scaling factors $\alpha$ and $\beta$;
   (c) causing the downhole processor to quantize the transform coefficients to obtain quantized coefficients;
   (d) transmitting the quantized coefficients uphole.

2. The method of claim 1, wherein the scaling factors are applied during quantization in (c).

3. The method of claim 2, wherein (c) further comprises causing the processor to multiply a first group of the coefficients by a scaling factor $(1/\alpha)^2$, a second group of the coefficients by a scaling factor $(1/\alpha)^2$, and a third group of the coefficients by a scaling factor $(1/\alpha)(1/\beta)$.

4. The method of claim 1, wherein each matrix element in the transform is selected from the group consisting of rational numbers and integers.

5. The method of claim 1, wherein the scaling factors $\alpha$ and $\beta$ are bounded rational numbers that are within a factor of two of one another.

6. The method of claim 1, wherein the transform is selected from the group consisting of:

$$\begin{pmatrix} 4 & 4 & 4 & 4 \\ 5 & 2 & -2 & -5 \\ 4 & -4 & -4 & 4 \\ 2 & -5 & 5 & -2 \end{pmatrix},$$

$$\begin{pmatrix} 25/2 & 25/2 & 25/2 & 25/2 \\ 17 & 6 & -6 & -17 \\ 25/2 & -25/2 & -25/2 & 25/2 \\ 6 & -17 & 17 & -6 \end{pmatrix},$$

$$\begin{pmatrix} 25/2 & 25/2 & 25/2 & 25/2 \\ 15 & 5 & -5 & -15 \\ 25/2 & -25/2 & -25/2 & 25/2 \\ 5 & -15 & 15 & -5 \end{pmatrix},$$

and scaled versions thereof.

7. A method for logging a subterranean borehole, the method comprising:
(a) acquiring first and second one-dimensional, pixilated traces of sensor data, each of the first and second pixilated traces including a plurality of borehole parameter values at a corresponding plurality of discrete tool face angles, the first and second pixilated traces acquired at corresponding first and second measured depths in the borehole;
(b) causing a downhole processor to compute a difference between the first and second pixilated traces to obtain residuals;
(c) causing the downhole processor to apply a transform to the residuals to obtain coefficients;
(d) causing the downhole processor to quantize the coefficients to obtain quantized coefficients; and
(e) transmitting the quantized coefficients uphole.

8. The method of claim 7, wherein (b) further comprises:
(i) reconstructing the first pixilated trace downhole using a downhole decoder to obtain a first reconstructed trace; and
(ii) causing the downhole processor to compute a difference between the second pixilated trace and the first reconstructed trace to obtain the residuals.

9. The method of claim 8, further comprising:
(f) decoding the quantized coefficients at the surface to obtain reconstructed residuals; and
(g) computing a sum of the reconstructed residuals and a reconstructed first trace obtained at the surface to obtain a reconstructed second trace.

10. The method of claim 8, wherein the downhole decoder includes a de-quantization step and an inverse transform step.

11. A method for logging a subterranean borehole, the method comprising:
(a) acquiring a one-dimensional pixilated trace of sensor data, the pixilated trace being representative of a single measured depth in the borehole and including a one-dimensional matrix having a plurality of borehole parameter values at a corresponding plurality of discrete tool face angles;
(b) causing the downhole processor to reorganize the one-dimensional matrix of parameter values to obtain a two-dimensional matrix of parameter values such that interior pixels in the one-dimensional matrix have their closest correlated pixels as direct neighbors along either a row or a column in the two-dimensional matrix;
(c) causing the downhole processor to apply a transform to the two-dimensional matrix of parameter values to acquire a two-dimensional matrix of transform coefficients;
(d) causing the downhole processor to quantize the transform coefficients to obtain quantized coefficients; and
(e) transmitting the quantized coefficients uphole.

12. The method of claim 11, wherein the two-dimensional matrix is configured such that each pixel in the one-dimensional matrix has its closest correlated pixels as direct neighbors along either a row or a column in the two-dimensional matrix.

13. The method of claim 11, wherein (b) further comprises utilizing a look-up table to map pixel locations between the one-dimensional matrix and the two-dimensional matrix.

14. The method of claim 11, wherein the transform is selected from the group consisting of discrete cosine transforms, Karhunen-Loeve transforms, wavelet transforms, and non-orthogonal, KLT-like transforms.

15. A method for logging a subterranean borehole, the method comprising:
(a) acquiring a pixilated trace of sensor data, the pixilated trace including a plurality of borehole parameter values at a corresponding plurality of discrete tool face angles;
(b) causing a downhole processor to compute a target number of bits to obtain during compression of the pixilated trace;
(c) causing the downhole processor to apply a transform to the pixilated trace to obtain coefficients;
(d) causing the downhole processor to quantize the coefficients a plurality of times using a corresponding plurality of quantization parameters to obtain a plurality of sets of quantized coefficients;
(e) causing the downhole processor to entropy encode each of the sets of quantized coefficients to obtain a corresponding bit stream for each of the sets;
(f) causing the downhole processor to select the set that has a number of bits closest to the target number of bits to obtain a preferred bit stream; and
(g) transmitting the preferred bit stream uphole.

16. The method of claim 15, wherein (b) further comprises causing the downhole processor to compute a difference between a target fullness and a current fullness in a coded image buffer.

17. The method of claim 15, wherein (d) further comprises causing the downhole processor to quantize the coefficients first, second, and third times using corresponding first, second, and third quantization parameters to obtain corresponding first, second, and third sets of quantized coefficients, the third quantization parameter obtained by interpolating between the first and second sets.

18. A method for logging a subterranean borehole, the method comprising:
(a) acquiring first and second one-dimensional, pixilated traces of logging while drilling sensor data, each the pixilated trace being representative of a single measured depth in the borehole and including a plurality of borehole parameter values at a corresponding plurality of discrete tool face angles, the first and second pixilated traces acquired at corresponding first and second measured depths in the borehole;
(b) causing a downhole processor to (i) compute a difference between the first and second pixilated traces to obtain residuals and (ii) compress the residuals to obtain a compressed trace; and
(c) transmitting the compressed trace to the surface.

19. The method of claim 18, wherein the method further comprises:
(d) decoding the compressed trace at the surface to obtain a reconstructed pixilated trace.

20. A method for logging a subterranean borehole, the method comprising:
(a) acquiring first and second one-dimensional, pixilated traces of sensor data, each of the first and second pixilated traces including a plurality of borehole parameter values at a corresponding plurality of discrete tool face angles, the first and second pixilated traces acquired at corresponding first and second measured depths in the borehole;
(b) causing a downhole processor to compute a difference between the first and second pixilated traces to obtain residuals;
(c) causing the downhole processor to reorganize the residuals to obtain a two-dimensional matrix of parameter values;
(d) causing the downhole processor to apply a non-orthogonal transform to the reorganized residuals to obtain transform coefficients;
(e) causing the downhole processor to compute a target number of bits to obtain during compression of the residuals;
(f) causing the downhole processor to quantize the coefficients a plurality of times using a corresponding plurality of quantization parameters to obtain a plurality of sets of quantized coefficients;
(g) causing the downhole processor to entropy encode each of the sets of quantized coefficients to obtain a corresponding bit stream for each of the sets;
(h) causing the downhole processor to select the set that has a number of bits closest to the target number of bits to obtain a preferred bit stream; and
(i) transmitting the preferred bit stream uphole.

21. The method of claim 20, further comprising:
(j) entropy decoding the bit stream at the surface to obtain reconstructed quantized coefficients;
(k) de-quantizing the reconstructed quantized coefficients at the surface to obtain reconstructed de-quantized coefficients;
(l) inverse transforming the reconstructed de-quantized coefficients at the surface to obtain reconstructed residuals; and
(m) computing a sum of the reconstructed residuals and a reconstructed first trace at the surface to obtain a reconstructed second trace.

* * * * *